(12) United States Patent
Sprickler

(10) Patent No.: US 7,938,534 B2
(45) Date of Patent: May 10, 2011

(54) SPRING HINGE BETWEEN A BOW AND A BOW CHEEK OF A PAIR OF SPECTACLES

(75) Inventor: Martin Sprickler, Traunkirchen (AT)

(73) Assignee: Redtenbacher Präzisionsteile Ges. m.b.H., Scharnstein (AT)

( * ) Notice: Subject to any disclaimer, the term of this patent is extended or adjusted under 35 U.S.C. 154(b) by 0 days.

(21) Appl. No.: 12/590,101

(22) Filed: Nov. 2, 2009

(65) Prior Publication Data
US 2010/0128219 A1    May 27, 2010

(30) Foreign Application Priority Data

Nov. 21, 2008  (AT) .................................. 1819/2008

(51) Int. Cl.
*G02C 5/22* (2006.01)
(52) U.S. Cl. ........................... 351/153; 351/113; 16/228
(58) Field of Classification Search .................. 351/113, 351/114, 153, 111, 41, 158; 16/228
See application file for complete search history.

(56) References Cited

U.S. PATENT DOCUMENTS

| 4,991,258 | A  | * | 2/1991  | Drlik ................................ 16/228 |
| 6,814,438 | B2 | * | 11/2004 | Desbiez-Piat ................. 351/153 |
| 7,735,193 | B2 | * | 6/2010  | Buchegger ....................... 16/228 |
| 2007/0192991 | A1 |  | 8/2007 | Buchegger |
| 2010/0162525 | A1 |  | 7/2010 | Wienicke et al. |

FOREIGN PATENT DOCUMENTS

| AT | 502 196       | 2/2007 |
| WO | WO 2006/053983 | 5/2006 |
| WO | WO 2008/087050 | 7/2008 |

* cited by examiner

*Primary Examiner* — Hung X Dang
(74) *Attorney, Agent, or Firm* — Collard & Roe, P.C.

(57) ABSTRACT

A spring hinge between a bow cheek and a bow of a pair of spectacles is described, having two hinge parts (3, 4), each associated with one of these spectacle parts (1, 2), one of which forms a bearing fork (6) having a hinge axis (5) for receiving the other hinge part (3), which is guided so it is displaceable with the aid of a sliding part (7) in a housing (9), and having a coiled spring (13) situated between two legs (12) of the sliding part (7), which is supported on one side on a web (14) of the sliding part (7) connecting the two legs (12) and on the other side on a housing-fixed buttress. In order to achieve simple installation conditions, it is proposed that the housing (9) has a closure part, which forms a receptacle opening (8) of the associated spectacle part (1) for the sliding part (7), and which forms the buttress for the coiled spring (13).

4 Claims, 1 Drawing Sheet

SPRING HINGE BETWEEN A BOW AND A BOW CHEEK OF A PAIR OF SPECTACLES

CROSS REFERENCE TO RELATED APPLICATIONS

Applicant claims priority under 35 U.S.C. §119 of Austrian Application No. A 1819/2008 filed on Nov. 21, 2008.

FIELD OF THE INVENTION

The invention relates to a spring hinge between a bow and a bow cheek of a pair of spectacles having two hinge parts, each associated with one of these spectacle parts, one of which forms a bearing fork having a hinge axis for receiving the other hinge part, which is guided so it is displaceable in a housing with the aid of a sliding part, and having a coiled spring situated between two legs of the sliding part, which is supported on one side on a web of the sliding part which connects the two legs and on the other side on a housing-fixed buttress.

DESCRIPTION OF THE PRIOR ART

To ensure simple assembly conditions, providing the bow-side hinge part with a U-shaped sliding part which engages in a housing recess is known in spring hinges (AT 502 196 B1), the sliding part receiving a coiled spring between its two legs, which is supported on one side on the web connecting the two legs of the sliding part and on the other side on a buttress, which is screwed into a nut thread of the housing coaxial to the coiled spring, and through a coaxial through opening of the bow-side hinge part. Such a design represents an advantageous condition for a housing closed in the peripheral direction, which can be inserted in a spectacle bow without difficulties from the front side. However, this simple installation capability is connected with increased construction effort, because a corresponding threaded hole in the housing is to be provided for the buttress and a passage opening is to be provided in the hinge part forming the sliding part, which allows the insertion of the buttress into the threaded hole.

For the concealed configuration of spring hinges, inserting the cheek-side hinge part which forms a bearing fork into a receptacle pocket of the bow cheek and also implementing a housing, which receives the bow-side, spring-loaded hinge part so it is displaceable, as an insert enclosed by the bow is known in plastic spectacles (WO 2006/053983 A1), so that the hinge parts essentially protrude only beyond the front faces of the bow cheek and/or the bow and are not recognizable when the bow is opened, because the front faces of the bow cheek and the bow are pressed flatly against one another by the spring hinge. Only a recess on the cheek inner side, which is required for the pivoting of the bow-side hinge part, remains. However, it is disadvantageous that the hinge axis must be inserted through a through opening in the bow cheek, which not only causes assembly difficulties, but rather also permits the inserted hinge axis to be externally recognized.

In a refinement of the spring hinge known from AT 502 196 B1, it is proposed according to prior art which has not been previously published that the cheek-side hinge part having the bearing fork receiving the hinge axis be anchored in a laterally closed receptacle pocket of the bow cheek, so that the hinge axis does not have to be inserted through the bow cheek. However, this requires the subsequent insertion of the bow-side hinge part, which is already articulated with the cheek-side hinge part, into the bow-side housing, which is only possible if the bow cheek exposes a passage for the buttress which is coaxial to the coiled spring in the pivoted-in position of the bow, so that the buttress for the coiled spring can be screwed into a corresponding threaded hole in the bow-side hinge housing.

SUMMARY OF THE INVENTION

The present invention is thus based on the object of implementing a spring hinge between a bow and a bow cheek of the type described at the beginning so that the construction effort for the frontal installation of the spring-loaded hinge part is simplified and, in addition, advantageous conditions are provided for a concealed spring hinge configuration.

The invention achieves the stated object in that the housing has a closure part, which forms a receptacle opening of the associated spectacle part for the sliding part, and which forms the buttress for the coiled spring.

Because, as a result of these measures, the housing itself forms the buttress for the coiled spring, no subsequent insertion of a buttress into the housing is required. However, this means that the coiled spring cannot be inserted into the housing in the axial direction. This is also not necessary, because with a sliding part which receives the coiled spring between two legs and using which the web connecting the two legs forms a support for the coiled spring, the coiled spring can be inserted into the sliding part before the fastening of the housing on the associated spectacle part, after the sliding part was inserted into the housing, so that the coiled spring can be inserted between the legs transversely to the spring axis on the housing side facing away from the hinge part, the coiled spring being supported on one side on the web of the sliding part and on the other side on the housing itself. The housing having the inserted sliding part impinged by the coiled spring can therefore be fastened frontally on the associated spectacle part, the housing itself representing a closure part for the receptacle opening of the spectacle part which receives the sliding part.

Because the housing having the hinge part mounted so it is displaceable therein via the sliding part can be frontally fastened on the associated spectacle part with little installation effort, advantageous conditions result for the implementation of a concealed spring hinge, in which a hinge part, which forms a bearing fork for receiving the hinge part having the sliding part, is inserted into a frontally open receptacle pocket of the other spectacle part, because no buttress for the coiled spring subsequently has to be inserted into the housing connected to the associated spectacle part. This means that to implement the concealed spring hinge, either the hinge axis can be inserted in a way known per se through the spectacle part forming the receptacle pocket into the bearing fork of the hinge part inserted into the receptacle pocket or the hinge part forming the bearing fork can be inserted into the laterally closed receptacle pocket after the connection of the two hinge parts by the hinge axis.

Particularly simple construction conditions result if the sliding part of the spring-loaded hinge part forms a frame which receives the coiled spring, via whose legs running in the longitudinal direction the sliding part is guided so it is displaceable in the housing, because a very stable construction results in this context due to the closed frame.

In order to connect the housing to the associated spectacle part in a simple way, the closure part forming the housing can form an attachment flange which can be screwed onto the front side of the associated spectacle part, so that the closure part is positioned correspondingly by the location of the attachment flange.

BRIEF DESCRIPTION OF THE DRAWING

The object of the invention is shown for exemplary purposes in the drawing. In the figures.

DESCRIPTION OF THE PREFERRED EMBODIMENT

Figure 1:
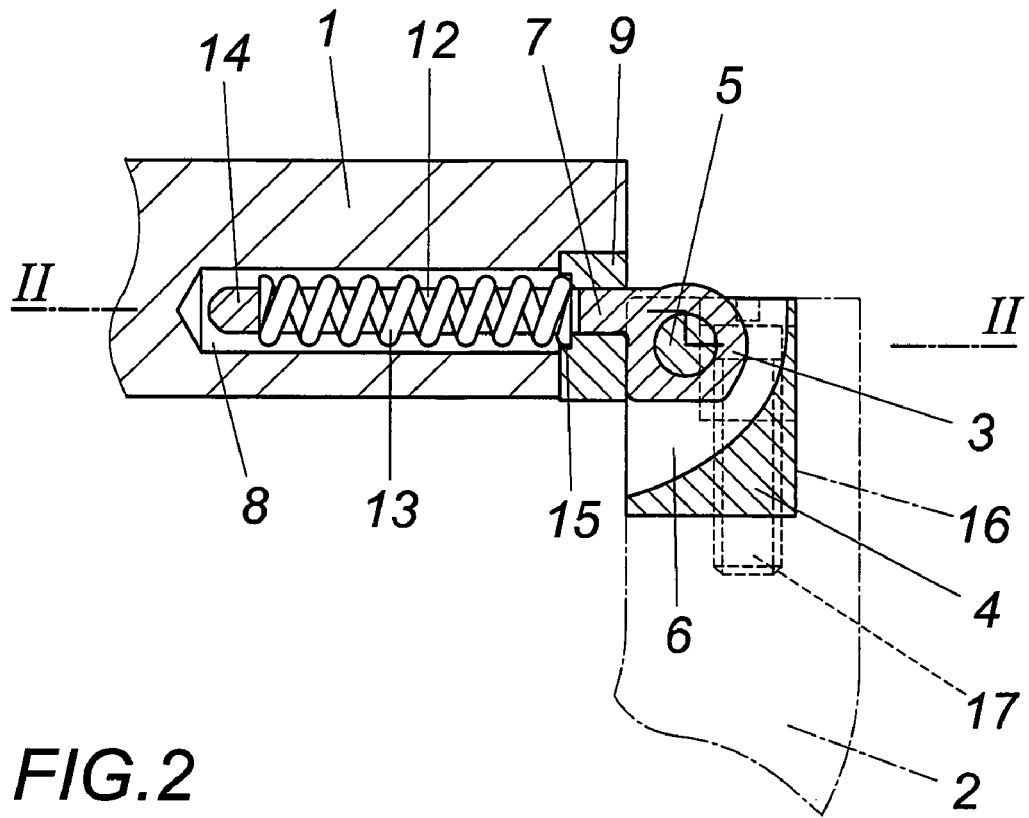
FIG. 1 shows a spring hinge of a pair of spectacles according to the invention in a schematic longitudinal section and FIG. 2 shows this spring hinge in a section along line II-II.

The illustrated spring hinge has two hinge parts 3, 4, each associated with one spectacle part 1, 2, namely a bow and a bow cheek, which are articulated with one another with the aid of a hinge axis 5. The hinge part 4 forms a bearing fork 6, in which the hinge part 3 engages. The typically bow-side hinge part 3, which can also be associated with the bow cheek, however, carries a sliding part 7, which is guided so it is displaceable in a housing 9, which terminates a receptacle opening 8 in the associated spectacle part 1. This housing 9 thus forms a frontal closure part for the receptacle opening 8, which is provided with an attachment flange 10, which can be frontally connected to the spectacle part 1 with the aid of screws 11. A coiled spring 13 is provided between the legs 12 of the sliding part 7 running in the longitudinal direction, the spring being supported on one side on a web 14, which connects the two legs 12 to one another, and on the other side on the housing 9, which is thus used as a direct buttress for the coiled spring 13. A corresponding centering recess 15 is provided for holding the coiled spring 13 in the housing 9.

Figure 2:
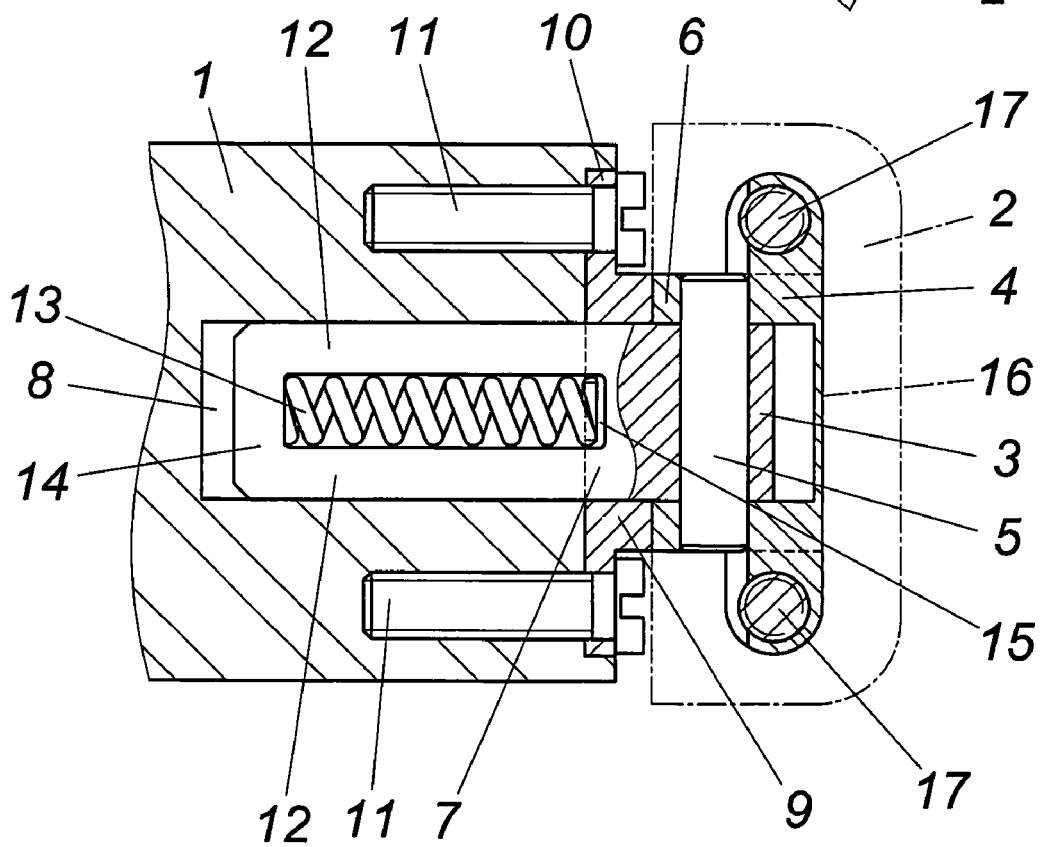

The hinge part 4 associated with the spectacle part 2, typically a bow cheek, forms an insert engaging in a receptacle pocket 16 of this spectacle part 2, which is fastened in the receptacle pocket 16, preferably but not necessarily so it is removable. For this purpose, the hinge part 4 can be screwed in place on the spectacle part 2 with the aid of screws 17, as can be inferred from FIG. 2 in particular.

In order to install the spring hinge, firstly the sliding part 7 of the hinge part 3 is pushed into the housing 9 and then the coiled spring 13 is inserted into the sliding part 7 on the side of the housing 9 facing away from the hinge part 3, in that the coiled spring 13 is inserted transversely to its axis between the legs 12 of the frame-like sliding part 7, so that its ends are supported with bias tension on one side on the web 14 and on the other side on the housing 9, the coiled spring 13 being held in the centering recess 15 of the housing 9 to secure its location. The housing having the spring-loaded hinge part 3 can then be screwed in place frontally on the associated spectacle part 1. The articulated connection between the two hinge parts 3 and 4 is performed after the bearing fork 6 of the hinge part 4 is pushed onto the hinge part 3 with the aid of the hinge axis 5, which is inserted through the aligned bearing holes of these hinge parts 3, 4. The hinge part 3 forming the bearing fork 6 can then be inserted into the laterally closed receptacle pocket 16 of the spectacle part 2, the side jaws of the receptacle pocket 16 preventing axial displacement of the hinge axis 5. When the hinge part 3, which forms the bearing fork 6, is screwed in place on the front side of the spectacle part 2, which is possible without difficulty when the spring hinge is angled, the installation of the spring hinge between bow and bow cheek is completed. The spring hinge can be disassembled again later through the detachable connection between the hinge part 4 forming the bearing fork 6 and the associated spectacle part 2. For this purpose, the hinge part 4 is merely to be removed from the receptacle pocket 16 after the screws 17 are loosened, so that the hinge axis 5 can be removed, after which the spring hinge falls apart into the two hinge parts.

The invention claimed is:

1. A spring hinge between first and second spectacle parts comprising a bow cheek and a bow of a pair of spectacles, said spring hinge having first and second hinge parts, each hinge part being associated with one of the first and second spectacle parts, wherein the first hinge part forms a bearing fork having a hinge axis for receiving the second hinge part, said second hinge part comprising a sliding part guided so said sliding part is displaceable in a housing, said sliding part comprising first and second legs and a web connecting the first and second legs, said spring hinge having a coiled spring situated between the first and second legs of the sliding part and supported on one side on the web of the sliding part connecting the first and second legs and on the other side on a buttress formed by the housing, wherein the housing forms a closure part closing a receptacle opening for the sliding part in the spectacle part associated with the second hinge part.

2. The spring hinge according to claim 1, wherein the first hinge part forms an insert which engages in a laterally closed receptacle pocket of the spectacle part associated with the first hinge part.

3. The spring hinge according to claim 1, wherein the sliding part of the second hinge part forms a frame which receives the coiled spring.

4. The spring hinge according to claim 1, wherein the closure part formed by the housing forms an attachment flange, which can be screwed onto the front side of the spectacle part.

\* \* \* \* \*